(12) United States Patent
Jakobs et al.

(10) Patent No.: US 11,964,603 B2
(45) Date of Patent: Apr. 23, 2024

(54) FOOT SUPPORT DEVICE FOR A FOOTWELL OF A VEHICLE

(71) Applicants: Audi AG, Ingolstadt (DE); ZF Automotive Germany GmbH, Alfdorf (DE)

(72) Inventors: Bernd Jakobs, Nuremberg (DE); Franz Fürst, Buxheim (DE); Walter Krönes, Gaimersheim (DE); Christoph Grundheber, Gaimersheim (DE)

(73) Assignees: AUDI AG, Ingolstadt (DE); ZF Automotive Germany GmbH, Alfdorf (DE)

( * ) Notice: Subject to any disclaimer, the term of this patent is extended or adjusted under 35 U.S.C. 154(b) by 82 days.

(21) Appl. No.: 17/762,621

(22) PCT Filed: Sep. 22, 2020

(86) PCT No.: PCT/EP2020/076381
§ 371 (c)(1),
(2) Date: Mar. 22, 2022

(87) PCT Pub. No.: WO2021/063739
PCT Pub. Date: Apr. 8, 2021

(65) Prior Publication Data
US 2022/0340066 A1    Oct. 27, 2022

(30) Foreign Application Priority Data

Sep. 30, 2019  (DE) .................... 10 2019 126 236.4

(51) Int. Cl.
*B60N 3/06*    (2006.01)
*B60R 21/015*  (2006.01)
(Continued)

(52) U.S. Cl.
CPC ........ *B60N 3/066* (2013.01); *B60R 21/01516* (2014.10); *B60R 21/02* (2013.01); *B60R 2021/0046* (2013.01)

(58) Field of Classification Search
CPC ... B60N 3/066; B60R 21/01516; B60R 21/02; B60R 2021/0046
See application file for complete search history.

(56) References Cited

U.S. PATENT DOCUMENTS

2008/0048423 A1   2/2008   Eriksson et al.
2013/0038107 A1*  2/2013   Tamura .................... B60N 2/20
                                                    297/331
(Continued)

FOREIGN PATENT DOCUMENTS

| CN | 106467040 A | 3/2017 |
| CN | 108327676 A | 7/2018 |

(Continued)

OTHER PUBLICATIONS

International Search Report of the International Searching Authority directed to related International Patent Application PCT/EP2020/076381, dated Nov. 5, 2020, with attached English-language translation; 5 pages.

(Continued)

*Primary Examiner* — Karen Beck
(74) *Attorney, Agent, or Firm* — Sterne, Kessler, Goldstein & Fox P.L.L.C.

(57) ABSTRACT

The present disclosure provides a foot support device for a footwell of a vehicle. The present disclosure includes a plurality of support elements arranged one behind the other and rotatably connected to one another. The plurality of support elements can each move from a rest position to an active position upon the detection of a predetermined driving situation. When set in the rest position, the plurality of support elements are each arranged parallel to the floor of (Continued)

the footwell, and when set in the active position, the plurality of support elements are each inclined with respect to the floor of the footwell to support at least one foot of an occupant. The foot support device includes a drive arrangement lifting at least a foremost support element to the active position, which causes movement of a subsequent support element.

9 Claims, 2 Drawing Sheets

(51) Int. Cl.
*B60R 21/02* (2006.01)
*B60R 21/00* (2006.01)

(56) References Cited

U.S. PATENT DOCUMENTS

| | | |
|---|---|---|
| 2017/0050539 A1 | 2/2017 | Akimoto |
| 2018/0201215 A1 | 7/2018 | El-Jawahri et al. |

FOREIGN PATENT DOCUMENTS

| | | | | |
|---|---|---|---|---|
| CN | 108909670 A | | 11/2018 | |
| DE | 4313566 C1 | * | 10/1994 | ............ B60N 3/063 |
| DE | 19548483 A1 | * | 6/1997 | ............ B60N 3/063 |
| DE | 102015213789 A1 | | 1/2017 | |
| DE | 102017007579 A1 | | 7/2018 | |
| EP | 1097847 A2 | * | 5/2001 | ............ B60N 3/066 |
| GB | 2510697 A | | 8/2014 | |
| KR | 20050009105 A | | 1/2005 | |
| KR | 20070023067 A | | 2/2007 | |
| KR | 100727179 B1 | * | 6/2007 | |

OTHER PUBLICATIONS

International Preliminary Report on Patentability directed to related International Patent Application No. PCT/EP2020/076381, dated Apr. 5, 2022, with attached English-language translation; 11 pages.

* cited by examiner

FOOT SUPPORT DEVICE FOR A FOOTWELL OF A VEHICLE

TECHNICAL FIELD

The invention relates to a foot support device for a footwell of a vehicle according to the claims of the invention.

BACKGROUND

Foot support devices for footwells of vehicles are known in numerous variations. The foot support devices can have a plurality of support elements, wherein at least one support element can be transferred from a rest position to an active position when detecting a predetermined driving situation. In the rest position, the at least one support element is arranged parallel to the floor of the footwell in this case. In the active position, the at least one support element has an angle of inclination with respect to the floor, the at least one support element supporting at least one foot of an occupant in the active position.

Airbags and belts are currently used in vehicles in order to adequately protect the occupant in an upright sitting position in the event of a collision. In order to allow for future requirements for piloted driving functions with comfort positions, new types of restraint systems are being developed and integrated into the vehicle. In today's comfort positions, in which a backrest is usually adjusted horizontally and/or a seat longitudinal adjustment is adjusted to the rear, the lower legs may "swing up" or the occupant may "dive" under a seat belt in the event of an impact. Furthermore, in particular in the case of a seat longitudinal adjustment to the rear, it can happen that the feet are relatively far away from the bulkhead or the pedal set. In the event of a crash, therefore, under certain circumstances, no counter-bearing can be formed at the feet and thus no "classic" occupant kinematics can be generated in which the feet are stretched forward. This can result in the knees sticking out. Pedals can also cause unforeseen or inhomogeneous impact bodies.

From DE 10 2017 007 579 A1, a vehicle is known having at least one generic foot support device of the generic type acting in a footwell, which foot support device comprises a plurality of support elements arranged one behind the other, which support elements can be transferred in each case from a rest position into an active position in a detected predetermined driving situation, such as a collision during an autonomous driving operation. In the rest position, the support elements are arranged parallel to the floor of the footwell and, in the active position, they have an angle of inclination with respect to the floor and support at least one foot of an occupant.

A safety foot support having a step plate is known from DE 10 2015 213 789 A1, the upper region of which can be fastened to a motor vehicle front wall by means of an upper hinge device and, in normal operation, has a foot support angle with respect to a virtual plane parallel to a roadway plane. In addition, the step plate has a lower hinge device between a lower region of the step plate and the motor vehicle floor and can be attached in such a way that the foot support angle outside normal operation corresponds to the foot support angle in normal operation.

SUMMARY OF INVENTION

The invention is based on the object of providing a foot support device for a footwell of a vehicle, which foot support device reduces the risk of injury to an occupant.

This object is achieved by a foot support device for a footwell of a vehicle with the features of claims. Advantageous configurations with expedient further developments of the invention are specified in the dependent claims.

In order to provide a foot support device for a footwell of a vehicle, which foot support device reduces the risk of injury to an occupant, a plurality of support elements are arranged one behind the other and are rotatably connected to one another, a drive arrangement lifting at least one foremost support element into its active position, and a movement of a raised front support element causing a movement of a subsequent support element.

In this way, different occupants with different body sizes, leg lengths, etc. can be protected in different sitting and comfort positions by the active foot support device.

According to the embodiments described herein, a predetermined driving situation can be understood to mean a situation in which the occupant has moved his vehicle seat into a comfort position and an impending or acute accident situation or strong acceleration is detected. In the comfort position, the occupant's feet can be at a distance from a front region of the footwell in which the feet are otherwise arranged when the vehicle seat is in a normal position. In addition, the vehicle seat can have a different angle of inclination than in an upright normal position of the vehicle seat. In addition, in the predetermined driving situation, at least one sensor unit detects the impending or acute accident situation or strong acceleration. The active foot support device is therefore only used in the event of a detected accident situation and supports the occupant kinematics of a comfort position based on that of an upright normal sitting position. In this case, the support elements of the active foot support device represent a parallel displacement of the foot support, which parallel displacement is caused in the normal sitting position by pedals or a front wall in the footwell. Furthermore, the active foot support device forms a homogeneous contact point for the pedals in the comfort position of the vehicle seat and thus prevents unfavorable interaction with the pedals, such as, for example, an oblique impact of the feet between the pedals.

A foot support device for the footwell of the vehicle is understood below to mean an assembly having a plurality of support elements. In this case, at least one support element can be transferred from a rest position to an active position when detecting the predetermined driving situation. In the rest position, the at least one support element is arranged parallel to the floor of the footwell and has an angle of inclination with respect to the floor in the active position, the at least one support element supporting at least one foot of the occupant in the active position.

Since the support elements are arranged one behind the other and rotatably connected to one another, and a movement of a raised front support element causes a movement of a subsequent support element, only the foremost support element can advantageously be driven in order to transfer the support elements into their active position. As a result, the weight of the foot support device according to an embodiment of the invention can be advantageously reduced. In addition, the foot support device according to an embodiment of the invention can have a plurality of support devices that are narrower for this purpose, without a complicated positioning device being used in order to transfer the support elements into the active position. A plurality of narrow support elements advantageously increases the probability that, in the predetermined driving situation, a support element is in the active position at a small distance from the at least one foot or from the heel of the foot. As a result, the at least one foot or its heel only covers a short distance in the predetermined driving situation until the heel is supported by the support element. Due to the small clearance of the at least one foot, the corresponding support element forms a counter-bearing for the feet in a comfort position of the vehicle seat, so that the feet and knees of the occupant cannot be stretched forward in the event of an impact. In addition, a support element arranged in front of the at least one foot or its heel can advantageously not lift the at least one foot during the transition into the active position and cannot transfer any additional kinetic energy to the at least one foot. This advantageously prevents or makes it more difficult for the at least one foot and a corresponding leg of the occupant to move in the vertical direction of the vehicle. This means that the lower legs "swinging up" and the occupant "diving through" under a seat belt can advantageously be prevented or at least made more difficult. As a result, the risk of injury to the occupant can advantageously be further reduced.

In a foot support device according to an advantageous embodiment of the invention, adjacent support elements can each be connected to one another via a pivoting joint. In this case, a rear end region of a front support element can be connected to a front end region of a support element located behind it via the corresponding pivoting joint. The pivoting joints advantageously allow a simple transfer of kinetic energy from the front support element to the following transfer element. In addition, an angle between the front support element and the subsequent support element can be predetermined by the corresponding pivoting joint. As a result, the pivoting joint also specifies the angle of inclination of the front support element when it is in its active position and the subsequent support element is in the rest position.

In a foot support device according to an advantageous embodiment of the invention, one of the support elements, which in the predetermined driving situation is arranged directly in front of the heel of the at least one foot, can form a heel contact point in the active position. In this case, a surface of the support elements facing the occupant can be dimensioned in such a way that the heels of the occupant are supported. Between the pedals on the driver side and the at least one foot, the support element creates a homogeneous contact surface by means of which ankle injuries can be reduced. In addition, such a contact surface can be created in the front footwell on the passenger side or in the rear footwell in front of the rear seats in order to also create a heel contact point there and prevent the corresponding occupant from diving under the waist belt.

In a foot support device according to an advantageous embodiment of the invention, the drive arrangement can have a drive and at least one actuator which is at least connected to the foremost support element and can be driven by the drive. By lifting the foremost support element, the support element can be transferred into the active position. The pivoting joint between the foremost support element and the subsequent support element can specify the angle of inclination between the vehicle floor and the first support element. In addition, the movement of the foremost support element can be transferred to the subsequent support elements. In this case, the foremost support element can be moved further in order to move the subsequent support element into its active position.

In a foot support device according to an advantageous embodiment of the invention, a weight force of the heel acting on a corresponding support element can act against a drive force generated by the drive. The weight force of the heel and the resulting increased power consumption of the drive, which power consumption can be detected by a sensor element, can determine whether the corresponding support element is resting on the occupant's heel and thus advantageously a position of the heel or foot on the vehicle floor. In this case, the drive can be deactivated after detection of the weight force or the increased power consumption. In addition, the support element which is closest to the heel can advantageously be transferred into the active position using simple means. In this case, the support elements are set up one after the other by the drive until the support element is reached on which the heel rests. Since the drive is deactivated when an increased power consumption is detected, the lifting of the heel can be prevented by the support element on which the heel rests. The sensor element can advantageously already be present as part of a motor fuse of the drive, so that no additional sensor elements or evaluation and control units are used to determine the position of the heel or to determine the support element which is closest to the heel.

In a foot support device according to an advantageous embodiment of the invention, the at least one actuator can fix the at least one corresponding support element in its active position. As a result, the corresponding support elements, and in particular the support element arranged directly in front of the heel, can advantageously be fixed in their current position.

In a foot support device according to an advantageous embodiment of the invention, at least one damping element can dampen forces in the predetermined driving situation, which forces are transmitted from the heel to the heel contact point. The risk of injury to the occupant's foot or leg can be further reduced by the damping element. In addition, any progressive, degressive, or linear characteristic of the damping can be implemented.

In a foot support device according to an advantageous embodiment of the invention, the support elements can each have at least one damping element. In this case, the at least one damping element can form the heel contact point of the corresponding support element. Alternatively, the damping element can be arranged between the heel contact point and a support arrangement of the support element.

In a foot support device according to an advantageous embodiment of the invention, the at least one damping element can be arranged between the at least one actuator and the corresponding support element.

The features and feature combinations mentioned above in the description, as well as the features and feature combinations mentioned below in the description of the figures and/or shown only in the figures, can be used not only in the respectively specified combination but also in other combinations or in isolation without getting out of the scope of the invention. Embodiments of the invention, which are not explicitly shown or explained in the figures but derive therefrom and can be produced by separated combinations of features from the embodiments explained, are thus to be regarded as included and disclosed.

BRIEF DESCRIPTION OF THE FIGURES

An embodiment of the invention is shown in the drawings and is explained in more detail in the following description. In the drawings, the same reference signs designate components or elements that perform the same or analogous functions. In the drawings.

DETAILED DESCRIPTION OF THE FIGURES

Figure 1:
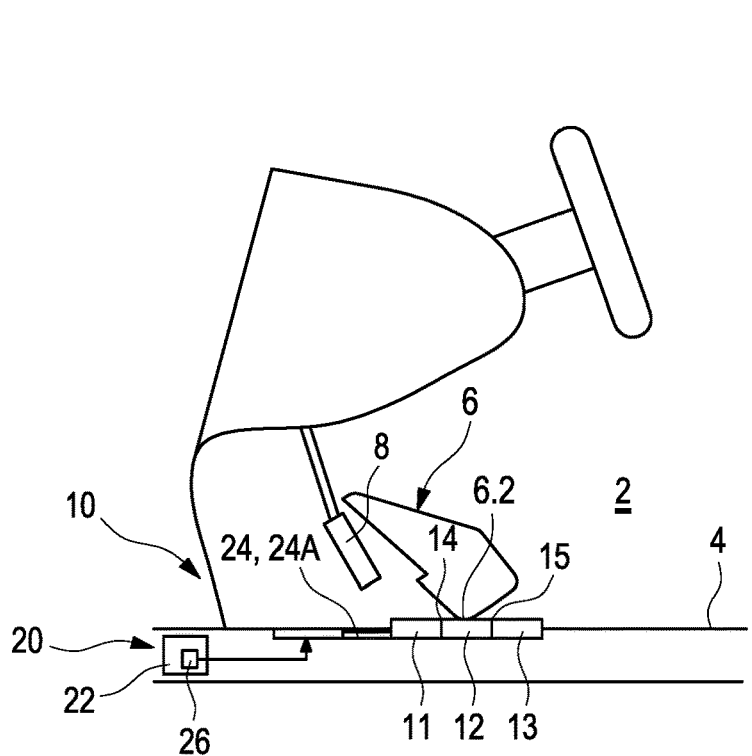
FIG. 1 is a schematic side view of a foot support device according to an embodiment of the invention for a footwell of a vehicle in a rest position.
Figure 2:
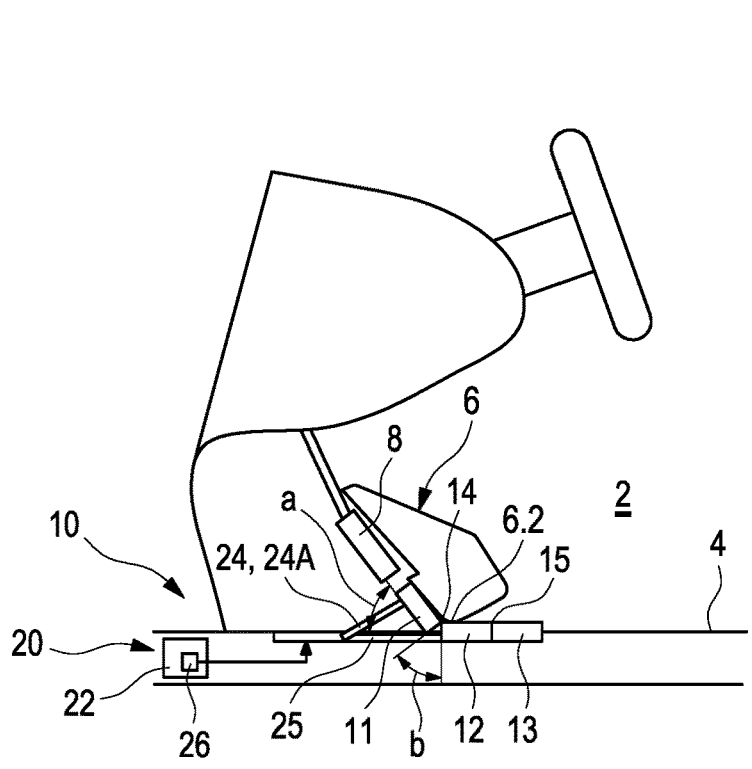
FIG. 2 is a schematic side view of the foot support device from FIG. 1 in a first operating position.
Figure 3:
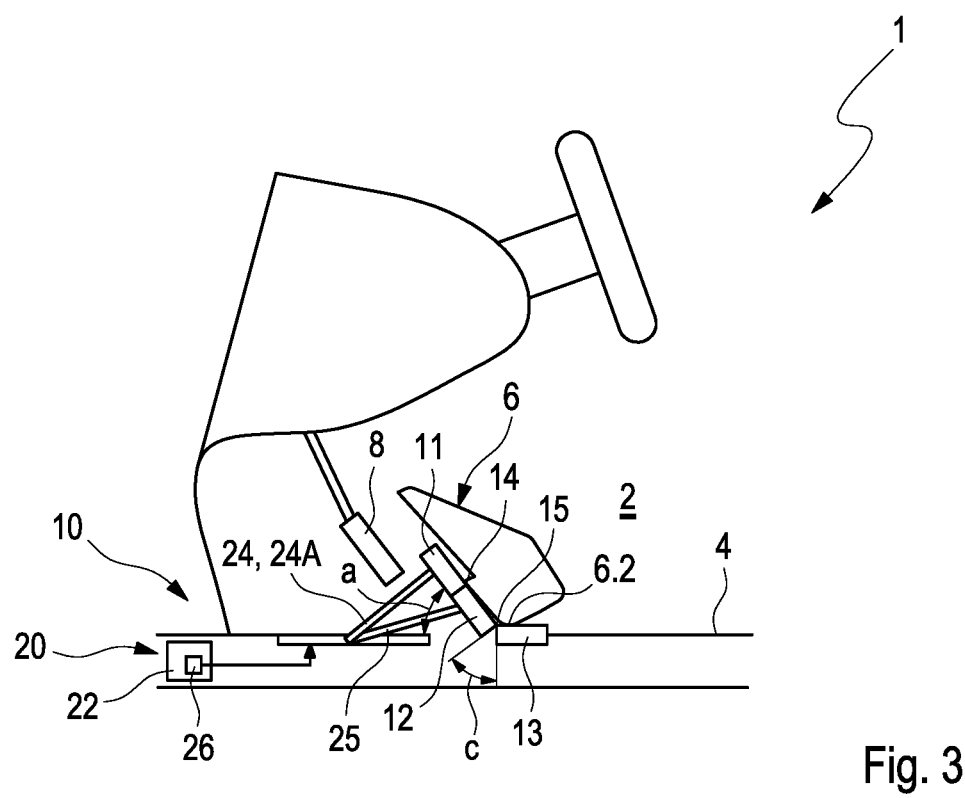
FIG. 3 is a schematic side view of the foot support device from FIGS. 1 and 2 in a second operating position.

As can be seen from FIGS. 1 to 3, a foot support device 10 for a footwell 2 of a vehicle 1 has a plurality of support elements 11, 12, 13, wherein at least one support element 11, 12, 13 can be transferred from a rest position into an active position when detecting a predetermined driving situation. In this case, in the rest position, the at least one support element 11, 12, 13 is arranged parallel to the floor 4 of the footwell 2 and, in the active position, has an angle of inclination a with respect to the floor 4. The at least one support element 11, 12, 13 supports at least one foot 6 of an occupant in the active position.

In this case, the support elements 11, 12, 13 are arranged one behind the other and are rotatably connected to one another, a movement of a raised front support element 11, 12 causing a movement of a subsequent support element 12, 13.

As can also be seen from FIGS. 1 to 3, the foot support device 10 according to an embodiment of the invention is arranged on a driver side in the illustrated embodiment of the vehicle 1. The foot support device 10 according to an embodiment of the invention can additionally or alternatively also be arranged on a passenger side or in a rear footwell in front of a rear bench or in the rear footwell in front of a rear seat.

As can also be seen from FIGS. 1 to 3, the inventive foot support device 10 in the illustrated embodiment has three support elements 11, 12, 13 which are arranged on the driver side on a floor 4 of the footwell 2 between pedals 8 and a seat (not shown). A first foremost support element 11 is arranged at the front in the direction of travel. A third rearmost support element 13 is arranged at the rear in the direction of travel and adjacent to the seat. A second support element 12 is arranged between the first support element 11 and the third support element 13. In an alternative embodiment (not shown) of the foot support device 10 according to an embodiment of the invention, only two support elements 11, 12, 13 or more than three support elements 11, 12, 13 can be arranged in the footwell 2.

As can also be seen from FIGS. 1 to 3, adjacent support elements 11, 12, 13 are connected in each case to one another via a pivoting joint 14, 15. In this case, a rear end region of a front support element 11, 12 is connected to a front end region of a subsequent support element 12, 13 via the pivoting joint 14, 15. A drive arrangement 20 lifts at least the foremost first support element 11. In this case, the drive arrangement 20 has a drive 22 and at least one actuator 24 which is connected to the foremost first support element 11 and can be driven by the drive 22. In the illustrated embodiment of the drive arrangement 20, the actuator 24 is designed as a lever 24A. An end region of the lever 24A facing the floor 4 is pivotably mounted and a second end region of the lever 24A facing the first support element 11 is rotatably connected to a front end region of the first support element 11 facing the lever 24A. A ball joint is arranged between the first support element 11 and the lever 24A. By pivoting the lever 24A, the front end region of the first support element 11 is raised. In this case, the angle of inclination a between the first support element 11 and the floor 4 increases. Since the first support element 11 is rotatably connected to the second support element 12 via the pivoting joint 14, the angle b between the first support element 11 and the second support element 12 also increases. The second support element 12 and the third support element 13 are in the rest position until the first support element 11 is in its active position shown in FIG. 2. If the lever 24A is driven further by the drive 22, the lever 24A lifts the rear end region of the first support element 11 from the floor 4. The front end region of the second support element 12, which is connected to the rear end region of the first support element 11, is also lifted off the floor 4 in this case. In this case, the angle b between the first support element 11 and the second support element 12 is reduced. In addition, by lifting the front end region of the second support element 12, the angle of inclination between the second support element 12 and the floor 4 and the angle c between the second support element 12 and the third support element 13 are increased. The third support element 13 is in the rest position until the second support element 12 is in its active position shown in FIG. 3. The first support element 11 and the second support element 12 are arranged parallel to one another in the illustrated embodiment. If the lever 24A is driven further, the rear end region of the second support element 12 and the front end region of the third support element 13 lift off the floor 4. This process can be continued until the rearmost support element 13 is in its active position. The rear end region of the rearmost support element 13 can be rotatably attached to the floor 4.

As can also be seen from FIGS. 2 and 3, a weight force of the heel 6.2 acts against the driving force of the drive 22 when the drive 22 tries to lift the support element 12, 13 on which the heel 6.2 rests. Usually, the feet 6 and thereby the heels 6.2 of the occupant are aligned parallel to one another, so that both heels 6.2 rest on the same support element 12, 13. The heels 6.2 can also be aligned offset to one another, so that the heels 6.2 rest on different support elements 12, 13.

In FIG. 2, the heel 6.2 rests on the second support element 12. In FIG. 3, the heel 6.2 rests on the third support element 13. The position of the heel 6.2 is dependent on the position of the seat on which the corresponding occupant is sitting. In addition, the position of the heel 6.2 is dependent on the length of the legs and the sitting position of the occupant. Depending on the position of the heel 6.2, the foot support device 10 according to an embodiment of the invention has a first operating position shown in FIG. 2, in which operating position the first support element 11 is in its active position and the second and third support elements 12, 13 each are in their rest position. In a second operating position shown in FIG. 3, the first and second support elements 11, 12 each are in their active position, and the third support element 13 is in its rest position. The number of possible operating positions of the foot support device 10 according to an embodiment of the invention is dependent on the number of support elements 11, 12, 13.

As can also be seen from FIGS. 2 and 3, in the embodiment shown, a sensor element 26 detects and evaluates a power consumption of the drive 22 in order to detect a weight force and thus a contact between a heel 6.2 and a support element 12, 13. If the two heels 6.2 of the occupant are arranged offset from one another, the sensor element 26 detects the weight force acting on the support element 12 on which the front heel 6.2 of the occupant rests. The drive 22 is deactivated as soon as the effective weight force of a heel 6.2 on a support element 12, 13 is detected. This is also the case when the rearmost support element 13 connected to the floor 4 is in the active position. In this case, the heel 6.2 does not rest on any support element 11, 12, 13. As a result, the support element 11, 12, 13 which is closest to the heel 6.2 is always in its active position and can support the heel 6.2 if necessary. The additional kinetic force or kinetic energy transmitted to the heel 6.2 via the support element 12, 13 on which the heel 6.2 rests is low because lifting the corresponding support element 12, 13 on which the heel 6.2 rests and thus a lifting of the heel 6.2 and the corresponding foot 6 is prevented.

Instead of the lever 24A, further suitable actuators 24 are conceivable in order to raise the support elements 11, 12, 13 one after the other. For example, an element with a telescopic extension or a cable pull or some other suitable arrangement could be driven by the drive 22 in order to raise the support elements 11, 12, 13.

As can also be seen from FIGS. 2 and 3, the support element 11, 12 which is arranged in front of the heel 6.2 of the foot 6 forms a heel contact point in the active position. In this case, the actuator 24 fixes at least the support elements 11, 12 in their active position, which support elements are arranged in front of the heel 6.2. The actuator 24 can lock in its position, for example, by means of a locking device. As a result, the actuator 24 supports the support elements 11, 12, 13 and, in a situation with active acceleration forces or acceleration energies, prevents the support elements 11, 12, 13 from being inadvertently transferred into the rest position. As a result, the corresponding support element 11, 12 reliably supports the heel 6.2 in the active position, on which the acceleration forces or acceleration energies act. In the illustrated embodiment of the drive arrangement 20, the drive arrangement 20 comprises an additional actuator 25 which is connected to the middle or second support element 12. This actuator 25 is also pivotably mounted on the floor 4 and is passively moved along with it when the corresponding support element 12 is raised. The actuator 25 is fixed or latched when the corresponding support element 12 is in its active position and supports it.

By using significantly more than three support elements 11, 12, 13, the potential distance between the heel 6.2 and a support element 11, 12, 13 set up in the active position can be significantly reduced, since the potential distance due to the width of the individual support elements 11, 12, 13 is determined. As a result, the use of a larger number of narrower support elements 11, 12, 13 increases the effectiveness of the active foot support device 10.

In the foot support device 10 according to an embodiment (not shown) of the invention, at least one damping element can dampen forces in the predetermined driving situation, which forces are transmitted from the heel 6.2 to the heel contact point. The damping element can have a progressive or degressive or linear characteristic. The support elements 11, 12, 13 can each have at least one damping element. For example, a damping element can form the heel contact point or be arranged in the region of the heel contact point. The damping element can be arranged on a surface facing the heel 6.2 or below the surface of the corresponding support element 11, 12, 13. Alternatively or additionally, at least one damping element can be arranged between the actuator 24 that can be driven by the drive 22 and the corresponding support element 11. Additionally or alternatively, at least one damping element can be arranged between the additional actuator 25 and the corresponding support element 12.

LIST OF REFERENCE SIGNS

1 Vehicle
2 Footwell
4 Floor
6 Foot
6.2 Heel
8 Pedal
10 Foot support device
11 First support element
12 Second support element
13 Third support element
14, 15 Pivoting joint
20 Drive arrangement
22 Drive
24 Actuator
24A Lever
25 Additional actuator
26 Sensor element
a Angle of inclination
b Angle between the first and second support element
c Angle between the second and third support element

The invention claimed is:

1. A foot support device for a footwell of a vehicle, comprising:
   a plurality of support elements including a first support element and a second support element, a front end of the second support element being disposed behind a rear end of the first support element, the plurality of support elements each rotatably connected to an adjacent support element, and the plurality of support elements each configured to move from a rest position to an active position upon detection of a predetermined driving situation, wherein when set in the rest position, the plurality of support elements are each arranged parallel to a floor of the footwell, and wherein when set in the active position, the plurality of support elements are each inclined at an angle with respect to the floor of the footwell to support a foot of an occupant; and
   a drive arrangement configured to lift the first support element from the rest position to the active position such that a movement of the first support element to the active position translates movement to the second support element so that the second support element moves from the rest position toward the active position.

2. The foot support device according to claim 1, wherein the first support element and the second support element are connected together by a pivoting joint.

3. The foot support device according to claim 1, wherein one of the plurality of support elements set in the active position is configured to provide a heel contact point for a heel of the foot of the occupant during the predetermined driving situation.

4. The foot support device according to claim 1, wherein the drive arrangement comprises a drive and a first actuator connected to the first support element, the drive configured to generate a drive force to drive the first actuator to move the first support element.

5. The foot support device according to claim 4, further comprising:
   a sensor element configured to detect a weight force applied by the heel of the occupant against a corresponding support element and the drive force,
   wherein the sensor element is configured to evaluate the weight force and the drive force, and wherein the sensor element is further configured to deactivate the drive based on the evaluation of the weight force and drive force.

6. The foot support device according to claim 4, wherein the first actuator is configured to fix at least one corresponding support element in the active position.

7. The foot support device according to claim 4, further comprising:
   a damping element configured to dampen forces applied during the predetermined driving situation, wherein the forces are translated from the heel to the heel contact point.

8. The foot support device according to claim 7, wherein the plurality of support elements each include a corresponding damping element.

9. The foot support device according to claim 8, wherein the corresponding damping element is disposed between the first actuator and a corresponding support element.

* * * * *